United States Patent
Kim

(10) Patent No.: US 9,235,389 B2
(45) Date of Patent: Jan. 12, 2016

(54) METHOD OF PROVIDING EMBEDDED SOFTWARE DEVELOPMENT TOOL FOR SUPPORTING EMBEDDED SOFTWARE DEVELOPMENT ENVIRONMENT BASED ON NATIVE BUILDING, AND APPARATUS THEREOF

(71) Applicant: ELECTRONICS AND TELECOMMUNICATIONS RESEARCH INSTITUTE, Daejeon (KR)

(72) Inventor: Jeong Si Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/554,913

(22) Filed: Nov. 26, 2014

(65) Prior Publication Data
US 2015/0149978 A1 May 28, 2015

(30) Foreign Application Priority Data
Nov. 27, 2013 (KR) .......................... 10-2013-0145009

(51) Int. Cl.
*G06F 9/44* (2006.01)
*G06F 9/45* (2006.01)
(52) U.S. Cl.
CPC ... *G06F 8/41* (2013.01); *G06F 8/20* (2013.01)
(58) Field of Classification Search
CPC .................................................... G06F 8/41
See application file for complete search history.

(56) References Cited

U.S. PATENT DOCUMENTS

| | | | |
|---|---|---|---|
| 2004/0244008 A1* | 12/2004 | Lee | 719/310 |
| 2007/0011494 A1* | 1/2007 | Xie et al. | 714/38 |
| 2011/0154285 A1 | 6/2011 | Kim | |
| 2012/0272209 A1* | 10/2012 | Biglari et al. | 717/105 |
| 2012/0324417 A1* | 12/2012 | Somani et al. | 717/101 |
| 2013/0080993 A1* | 3/2013 | Stravers et al. | 717/104 |
| 2014/0189679 A1* | 7/2014 | Adams et al. | 717/174 |

FOREIGN PATENT DOCUMENTS

| | | |
|---|---|---|
| KR | 10-2011-0013192 A | 2/2011 |
| KR | 10-2011-0071474 A | 6/2011 |

* cited by examiner

*Primary Examiner* — Philip Wang
(74) *Attorney, Agent, or Firm* — Rabin & Berdo, P.C.

(57) ABSTRACT

Disclosed are a method of providing an embedded software development tool for supporting an embedded software development environment based on native building, and an apparatus thereof. The method includes extracting information about a toolchain according to a request by the host system, and providing the extracted information to the host system, generating a project execution file by receiving a project, to which the information about the toolchain is applied, from the host system, and building the project, and generating a project execution result by executing the project execution file, thereby providing an embedded software development environment capable of minimizing the economic costs incurred for acquiring a cross toolchain corresponding to hardware and a platform of a target system and performing a development process when embedded software is developed.

11 Claims, 3 Drawing Sheets

METHOD OF PROVIDING EMBEDDED SOFTWARE DEVELOPMENT TOOL FOR SUPPORTING EMBEDDED SOFTWARE DEVELOPMENT ENVIRONMENT BASED ON NATIVE BUILDING, AND APPARATUS THEREOF

CLAIM FOR PRIORITY

This application claims priority to Korean Patent Application No. 2013-0145009 filed on Nov. 27, 2013 in the Korean Intellectual Property Office (KIPO), the entire contents of which are hereby incorporated by reference.

BACKGROUND

1. Technical Field

Example embodiments of the present invention relate in general to the field of a method of providing an embedded software development tool for supporting an embedded software development environment based on native building, and an apparatus thereof.

2. Related Art

An embedded system represents a system in which hardware and software are combined and dedicated to a particular function. The embedded system may include various information processing devices, for example, home appliances such as DVD players, MP3 players, digital cameras, TVs, refrigerators, and washing machines, medical devices, vehicles, aircraft and spacecraft.

With the recent development of the information processing technology, hardware and software incorporated into the embedded system has become to have improved performance, which contributes to the popularization of general-purpose embedded devices, such as smart phones, tablet PCs, and personal digital assistants (PDAs). In this regard, there have been efforts to develop embedded software capable of performing various and complex functions by using embedded software development tools.

The conventional embedded software development environment has been operated such that a host system for developing embedded software is separated from a target system for executing the developed software, due to the limited performance of the target system in hardware resources, such as a processor, a memory, an input/output (I/O) device, and a network device, and software resources, such as an operating system, system software and application software.

For example, the convention technology provides a cross-compile based embedded software development environment in which a host system compiles a source code written by a developer by using a compiler provided for a target system to generate an embedded software execution file converted into an object code, and transmits the generated embedded software execution file to the target system, and the target system executes the embedded software execution file received from the host system.

However, the cross-compile based embedded software development environment has a limitation in that embedded software to be executed in a target system is developed only when a host system secures a toolchain of the target system, therefore a great amount of cost and effort are required for acquiring a toolchain of a target system rather than for developing the embedded software. In addition, there is another limitation that a host system needs to secure a different toolchain if hardware and platform of a target system are changed, which confirms the inefficiency of the cross-compile based embedded software development environment.

In particular, a target system has to be able to load high-end hardware resources and software resources due to the development of information communication technologies, so there is a need for an embedded software development environment that is applicable to such a target system loading high-end hardware and software resources.

SUMMARY

Accordingly, example embodiments of the present invention are provided to substantially obviate one or more problems due to limitations and disadvantages of the related art.

Example embodiments of the present invention provide a method of providing an embedded software development tool capable of minimizing the economic costs incurred for acquiring a cross toolchain corresponding to hardware and a platform of a target system and accordingly performing a development process when embedded software is developed.

Example embodiments of the present invention also provide an apparatus for providing an embedded software development tool for providing native-building embedded software development environment, applicable to a target system in the recent trend of loading high-end hardware and software resources.

In some example embodiments, a method of providing an embedded software development tool executed in a target system in which software developed by a host system is implemented includes: extracting information about a toolchain according to a request by the host system, and providing the extracted information to the host system; generating a project execution file by receiving a project, to which the information about the toolchain is applied, from the host system, and building the project; and generating a project execution result by executing the project execution file.

The information about the toolchain may include information about at least one toolchain selected from among an assembler, a linker and a compiler that are configured to translate software developed in the host system into a machine language, and a library of an operating system implemented in the target system.

The information about the toolchain may be extracted and provided to the host system, thereby supporting an embedded software development environment based on native building.

In the generating of the project execution file, the project execution file may be generated by receiving the project from the host system, storing the received project, and performing a project build by executing a build script constituting the project.

In the generating of the project execution result, the project execution result may be generated by receiving project execution information including at least one of the project, identification information of the project and execution environment information of the project from the host system, and executing the project execution file corresponding to the project execution information.

The method may further include providing the project execution file or the project execution result to the host system.

In other example embodiments, an apparatus for providing an embedded software development tool implemented in a target system includes: a toolchain information providing unit, an execution file generating unit and an execution result generating unit. The toolchain information providing unit may be configured to extract information about a toolchain according to a request by a host system, and provide the extracted information to the host system. The execution file generating unit may be configured to generate a project execution file by receiving a project, to which the information about the toolchain is applied, from the host system, and building the project. The execution result generating unit may be configured to generate a project execution result by executing the project execution file.

The apparatus may further include a process result providing unit configured to provide the project execution file or the project execution result to the host system.

The host system may determine at least one development tool among a project creating tool, a project build tool and a project execution tool according to a selection by a developer, and provide a project processed by a function corresponding to the determined development tool.

As is apparent from the above, the method of providing an embedded software development tool for supporting an embedded software development environment based on native building and the apparatus thereof can minimize the economic costs incurred for acquiring a cross toolchain corresponding to hardware and platform of a target system and accordingly performing a development process when embedded software is developed.

In addition, the method of providing an embedded software development tool for supporting an embedded software development environment based on native building and the apparatus thereof can provide a native-building based embedded software development environment that is applicable to a target system that is in the trend of loading high-end hardware and software resources.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
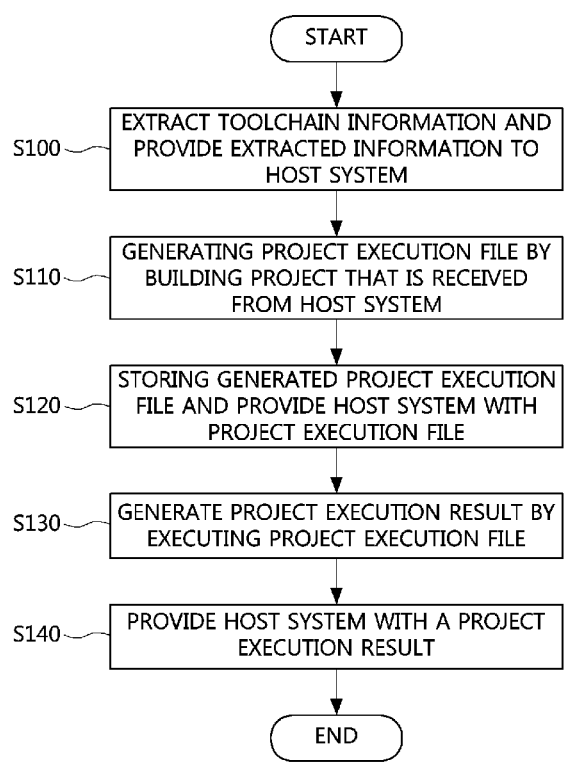
FIG. 1 is a flowchart showing a method of providing an embedded software development tool according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following specification, a host system may represent a user terminal such as a personal computer (PC) and a notebook, which is an information processing apparatus configured to provide a user interface, such as a programming language editor or a source code editor, and a translator, such as a compiler or a linker, allowing developed embedded software to be transformed into machine languages. However, the host system according to the present invention is not limited thereto, and may be variously implemented.

In addition, a target system may represent an information processing apparatus for executing embedded software developed in a host system by including hardware resources, that is, a central processing unit (CPU), such as a microprocessor, a microcontroller, and a digital signal processor (DSP), and a memory such as a random access memory (RAM), and a read only memory (ROM); and software resources, that is, an operating system and a system application. Examples of the target system may include home appliances such as MP3 players, portable media players (PMPs), DVD players, washing machines and TVs, vehicles, aircraft, spacecraft, smartphones, or tablet PCs, and personal digital assistants (PDAs).

The host system and the target system may be connected to each other through various communication interfaces, such as a cable, a Universal Serial Bus (USB), Serial and ethernet.

Hereinafter, example embodiments according to the present invention will be described in detail with reference to accompanying drawings.

FIG. 1 is a flowchart showing a method of providing an embedded software development tool according to an example embodiment of the present invention.

Referring to FIG. 1, a method of providing an embedded software development tool includes extracting information about a toolchain according to a request by a host system, and providing the extracted information to the host system (S100), generating a project execution file by building a project that is received from the host system (S110) and generating a project execution result by executing the project execution file (S130).

In addition, the method may further include storing the generated project execution file, and providing the host system with the project execution file (S120), and providing the host system with the generated result of the execution of the project execution file (S140).

The method of providing an embedded software development tool may be performed by a target system in which embedded software developed in the host system is executed. The method of providing an embedded software development tool, which is provided to overcome the limitation of the convention embedded software development tool based on cross compiling, provides a native build-based embedded software development environment which removes the need to acquire a cross toolchain by allowing a host system and a target system to have the same development environment.

In order to provide a native-build based embedded software development environment, first, at least one development tool may be determined when a developer using a host system selects at least one of a project creating tool, a project build tool and a project execution tool.

The selecting of the development tool by the developer is performed because a target system of today is able to directly build or execute a source code of embedded software according to the development of information communication technology, different from the conventional target system that is configured only to test or debug an object code of embedded software created in a host system due to limitation of hardware resources and software resources.

When the project creating tool is determined by the developer, the target system extracts information about a toolchain according to a request by the host system, and provides the host system with the extracted information about a toolchain (S100). In this manner, the host system and the target system are configured to have the same development environment.

In this case, the information about the toolchain may include information about at least one toolchain selected from among an assembler, a linker and a compiler configured to translate software developed in the host system into a machine language, and a library of an operating system implemented in the target system.

Accordingly, the host system creates a project based on the information about the toolchain provided from the target system, and a developer may designate project identification information, such as a name or a number of the project, and a location in which the project is to be stored.

That is, since a project corresponding to a toolchain of the target system is created, the economic costs required for acquiring a toolchain and performing a development process according to a development environment of a target system can be minimized.

When the project build tool is selected by the developer in the host system, a project is received from the host system and a project build is performed on the received project, so that a project execution file is generated (S110).

In more detail, the host system, when a project build is requested, may compress a project and provide the target system with the compressed project. The compressed project may not only include an embedded software source code written by a developer but also include project attribute information indicating what type of toolchain information of a target system is included and a build script used to build the written source code.

Accordingly, the target system uncompresses the compressed project, records the uncompressed project in a storage device, such as a file system or a database, and then performs a project build by executing the build script constituting the project.

The project build may be performed by an assembler, a compiler and a linker, incorporated in the target system, so that the source code written in a high-level programming language, such as C, C++ and JAVA, is converted into an object code corresponding to a machine language, and thus an object file is generated. In this case, one or more object files may be merged and linked to an operating system of the target system, so that a project execution file is generated.

The project execution file generated as such is recorded in a storage device of the target system, such as a file system or a database, and then provided to the host system (S120).

When the project execution tool is selected by the developer in the host system, a project execution file is executed, so that a result of execution of a project is generated (S130). In this case, in order to execute a project, project execution information including at least one of a project, identification information of the project and execution environment information of the project is received from the host system.

The identification information of the project may include a name of the project, a number of the project, a storage location of the project and a storage path of the project that are predetermined by the developer in the process of creating the project. In addition, the execution environment information about the project may represent information about a toolchain of the target system that has been applied to the project, but may be not limited thereto.

Accordingly, a project execution file corresponding to the received project execution information is searched for in the storage device, such as a file system or a database, and executed, so that a project execution result is generated. The generated project execution result may be provided to the host system (S140).

In the conventional technology, a project build process and a project execution process are performed only in the host system due to the limited performance of hardware or software resources of the target system. That is, first, the host system builds a project, and a project execution file is generated unless an error or bug occurs in the project. Thereafter, the project execution file is executed, and only the result of the execution is transmitted to the target system. However, the target system according to the present invention directly performs a project build and a project execution, so that a more effective and intuitive embedded software development environment is provided when compared to the conventional technology.

Figure 2:
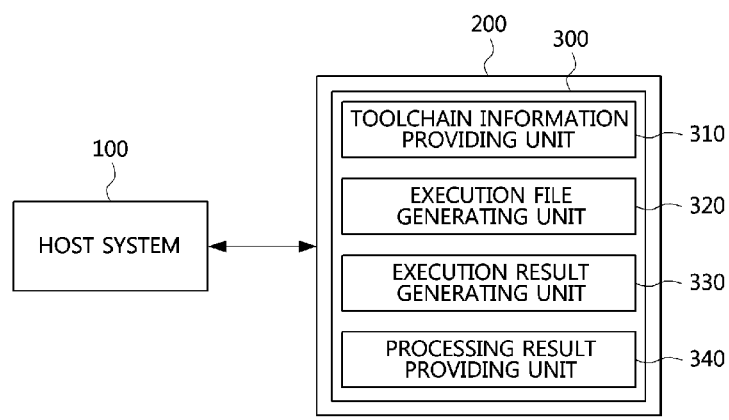
FIG. 2 is a block diagram illustrating an apparatus for providing an embedded software development tool according to an example embodiment of the present invention.

FIG. 2 is a block diagram illustrating an apparatus for an embedded software development tool according to an example embodiment of the present invention.

Referring to FIG. 2, an apparatus for providing an embedded software development tool 300 may be implemented by a target system 200. The target system 200 in which the embedded software development tool providing apparatus 300 is implemented may be connected to a host system 100 through various communication interfaces, such as a cable, a Universal Serial Bus (USB), a serial port and ethernet.

The host system 100 may be operated by a developer who develops embedded software, and at least one development tool may be determined among a project creating tool, a project build tool and a project execution tool according to a selection of the developer.

Although the development tools selected by the developer are illustrated as a project creating tool, a project build tool and a project execution tool, the development tool is not limited thereto, and may be provided using various development tools used in the development of embedded software.

The embedded software development tool providing apparatus 300 may include a toolchain information providing unit 310, an execution file generating unit 320 and an execution result generating unit 330, and may further include a processing result providing unit 340.

The toolchain information providing unit 310, when a project creating tool is determined according to a selection by a developer using the host system 100, extracts information about a toolchain according to a request by the host system, and provides the extracted information to the host system 100.

In this case, the information about the toolchain may include information about at least one toolchain selected from among an assembler, a linker and a compiler, which are configured to translate software developed in the host system 100 into a machine language, and a library of an operating system implemented in the target system 200.

The host system 100 creates a project based on the information about the toolchain, and the developer may designate project identification information, such as a name or a number of the project, and a location in which the project is to be stored. In this manner, the host system and the target system are configured to have the same development environment.

The execution file generating unit 320, when the project build tool is selected by the developer, receives a project from the host system 100 and performs a project build on the received project, thereby generates a project execution file.

In this case, the host system 100 provides the project that is compressed. The compressed project may not only include an embedded software source code written by the developer but also include project attribute information indicating what type of toolchain information of the target system is included and a build script used to build the written source code.

Accordingly, the execution file generating unit 320 uncompresses the compressed project, records the uncompressed project in a storage device such as a file system or a database, and then performs a project build by executing a build script.

The execution result generating unit 330, when the project execution tool is selected by the developer, executes a project execution file, so that a result of the execution of a project is generated. In this case, in order to execute a project, project execution information including at least one of a project, identification information of the project and execution environment information of the project is received from the host system 100.

The identification information of the project may include a name of the project, a number of the project, a storage location of the project and a storage path of the project that are predetermined by the developer in the process of generating the project. In addition, the execution environment information about the project may represent information about a toolchain of the target system that has been applied to the project, but may be not limited thereto.

The processing result providing unit 340 may provide the host system 100 with the project execution file generated by the execution file generating unit 320 or a project execution result generated in the execution result generating unit 330.

Figure 3:
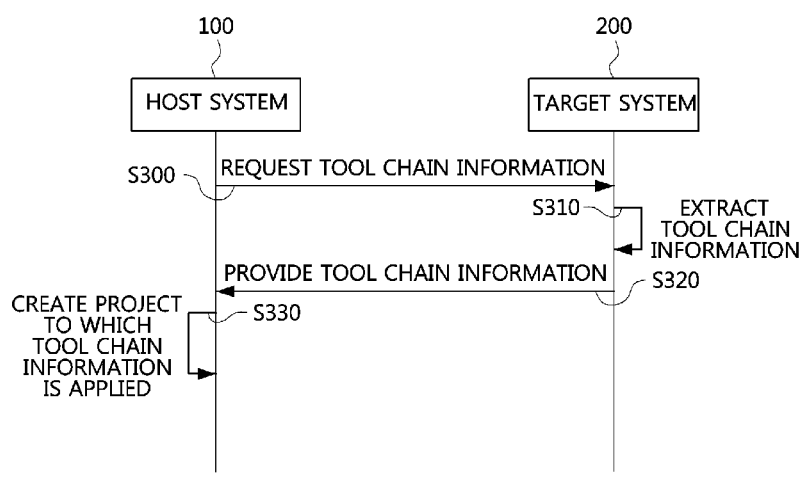
FIG. 3 is a view illustrating an example in which a project is created when a project creating tool is selected by a developer in a host system according to an example embodiment of the present invention.
Figure 4:
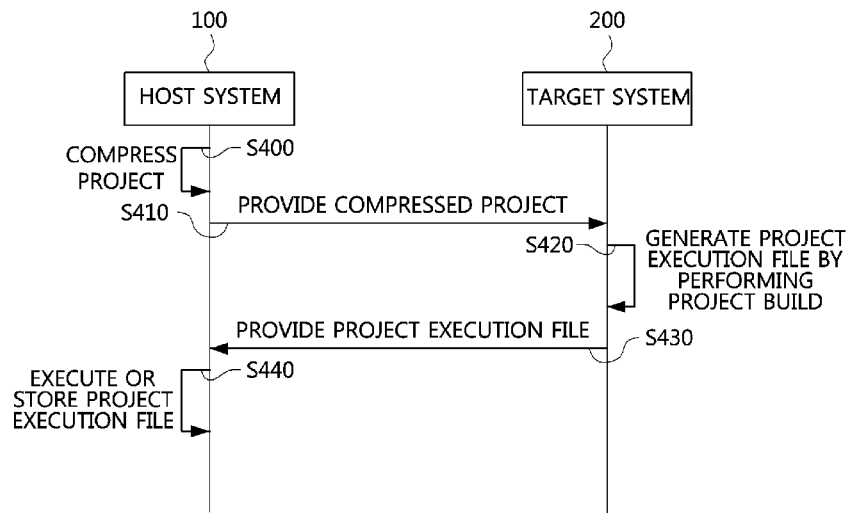
FIG. 4 is a view illustrating an example in which a project build is performed when a project build tool is selected by a developer in a host system according to an example embodiment of the present invention.

FIG. 3 is a view illustrating an example in which a project is created when a project creating tool is selected by a developer in a host system according to an example embodiment of the present invention, and FIG. 4 is a view illustrating an example in which a project build is performed when a project build tool is selected by a developer in a host system according to an example embodiment of the present invention.

Figure 5:
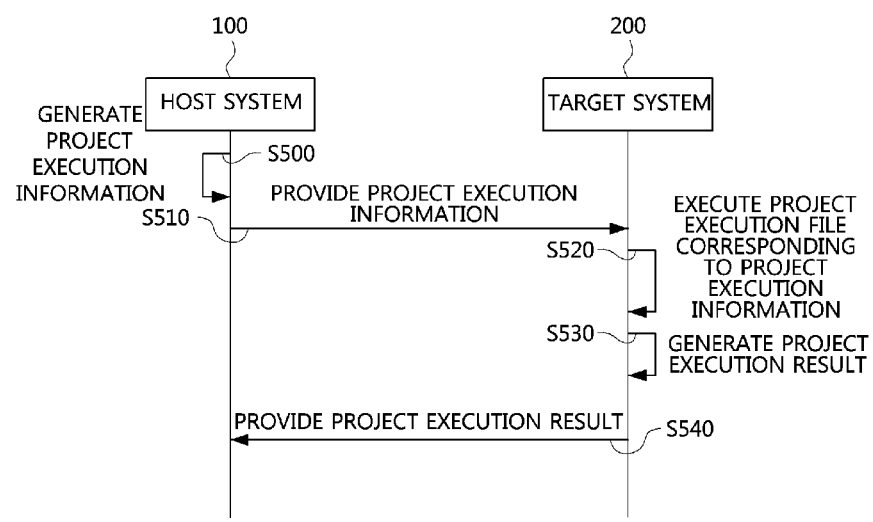
FIG. 5 is a view illustrating an example in which a project is executed when a project execution tool is selected by a developer in a host system according to an example embodiment of the present invention.

FIG. 5 is a view illustrating an example in which a project is executed when a project execution tool is selected by a developer in a host system according to an example embodiment of the present invention.

Referring to FIGS. 3 to 5, development of embedded software is performed by the host system 100, and the target system 200 in which the apparatus for embedded software development tool 300 is provided.

First, at least one development tool may be determined among a project creating tool, a project build tool and a project execution tool according to a selection by a developer of the host system 100.

When the determined development tool is the project creating tool, as shown in FIG. 3, the host system 100 may request information about a toolchain from the target system 200 (S300).

Accordingly, the target system 200 may extract tool chain information, including library information of an operating system implemented in the target system and translator information about a translator, such as an assembler, a compiler and a linker (S310), and provide the host system 100 with the extracted tool chain information (S320).

The host system 100 creates a project to which the toolchain information provided from the target system 200 is applied (S330), and a developer may set project identification information, such as a name or a number of the project, and a location and path in which the project is to be stored. The host system 100 may write source codes regarding desired embedded software by using the created project.

When the development tool determined by the developer is the project build tool, as shown in FIG. 4, a project including a source code file written by the developer, attribute information about the project and a build script is compressed (S400), and the compressed project is provided to the target system 200 (S410).

The target system 200 uncompresses the compressed project, records the uncompressed project in a memory of the target system 200, and performs a project build by executing the build script. In more detail, when the project build is performed by an assembler, a compiler and a linker incorporated in the target system 200, the source code written in a high-level programming language, such as C, C++ and JAVA, is transformed into an object file including object codes translated in the form of a machine language. In this case, one or more object files may be merged and linked to an operating system of the target system, so that a project execution file is generated (S420).

The generated project execution file may be recorded in a storage device such as a file system or a database, and then provided to the host system 100 (S430). Accordingly, the host system 100 may store the received project execution file in a storage device of the host system 100, and executes a translator such as a compiler and a linker incorporated in the host system 100, thereby checking a result of the execution of the project (S440).

When the development tool determined by the developer is the project execution tool, as shown in FIG. 5, project execution information including at least one of a project, identification information of the project and execution environment information of the project is generated (S500), and provided to the target system 200 (S510).

The target system 200 searches for a project execution file corresponding to the received project execution information in the storage device, and executes the found project execution file (S520) to generate a project execution result (S530). The generated project execution result may be provided to the host system 100 (S540).

As described above, in the host system 100, a project is processed by performing a function corresponding to a development tool determined by the host system 100, and the project is provided to the target system 200, and in the target system 200, the project is subject to a project build or project execution and the result of the execution of the project is provided to the host system 100, so that a native-building based embedded software development environment is constructed.

Although the development tool selected by the developer is illustrated as a project creating tool, a project build tool and a project execution tool, the development tool is not limited thereto, and may be provided using various development tools used in the development of embedded software.

According to the method of providing an embedded software development tool and the apparatus thereof, the economic costs incurred for acquiring a cross toolchain corresponding to hardware and platform of a target system and accordingly performing a development process when embedded software is developed can be minimized.

In addition, the method of providing an embedded software development tool and the apparatus thereof can provide a native-building based embedded software development environment applicable to a target system that is in the trend of loading high-end hardware and software resources.

While the example embodiments of the present invention and their advantages have been described in detail, it should be understood that various changes, substitutions and alterations may be made herein without departing from the scope of the invention.

What is claimed is:

1. A method of providing an embedded software development tool executed in a target system in which software developed by a host system is implemented, the method comprising:
    extracting information about a toolchain according to a request by the host system, and providing the extracted information to the host system;
    generating a project execution file by receiving a project, to which the information about the toolchain is applied, from the host system, and building the project; and
    generating a project execution result by executing the project execution file; wherein the information about the toolchain includes information about at least one toolchain selected from among an assembler, a linker and a compiler that are configured to translate software developed in the host system into a machine language, and a library of an operating system implemented in the target system.

2. The method of claim 1, wherein the information about the toolchain is extracted and provided to the host system, thereby supporting an embedded software development environment based on native building.

3. The method of claim 1, wherein in the generating of the project execution file, the project execution file is generated by receiving the project from the host system, storing the received project, and performing a project build by executing a build script constituting the project.

4. The method of claim 1, wherein in the generating of the project execution result,
    the project execution result is generated by receiving project execution information including at least one of the project, identification information of the project and execution environment information of the project from the host system, and executing the project execution file corresponding to the project execution information.

5. The method of claim 1, further comprising providing the project execution file or the project execution result to the host system.

6. An apparatus for providing an embedded software development tool implemented in a target system, the apparatus comprising:
    a toolchain information providing unit configured to extract information about a toolchain according to a request by a host system, and provide the extracted information to the host system;
    an execution file generating unit configured to generate a project execution file by receiving a project, to which the information about the toolchain is applied, from the host system, and building the project; and
    an execution result generating unit configured to generate a project execution result by executing the project execution file; wherein
    the information about the toolchain includes information about at least one toolchain selected from among an assembler, a linker and a compiler that are configured to translate software developed in the host system into a machine language, and a library of an operating system implemented in the target system.

7. The apparatus of claim 6, wherein the information about the toolchain is extracted and provided to the host system, thereby supporting an embedded software development environment based on native building.

8. The apparatus of claim 6, wherein the execution file generating unit generates the project execution file by receiving the project from the host system, storing the received project and performing a project build by executing a build script constituting the project.

9. The apparatus of claim 6, wherein the execution result generating unit generates the project execution result by receiving project execution information including at least one of the project, identification information of the project and execution environment information of the project from the host system, and executing the project execution file corresponding to the project execution information.

10. The apparatus of claim 6, further comprising a process result providing unit configured to provide the project execution file or the project execution result to the host system.

11. The apparatus of claim 6, wherein the host system determines at least one development tool among a project creating tool, a project build tool and a project execution tool according to a selection by a developer, and provides a project processed by a function corresponding to the determined development tool.

* * * * *